(12) United States Patent
Amaro Ramirez et al.

(10) Patent No.: US 11,650,747 B2
(45) Date of Patent: May 16, 2023

(54) HIGH THROUGHPUT MEMORY PAGE RECLAMATION

(71) Applicant: VMware, Inc., Palo Alto, CA (US)

(72) Inventors: Emmanuel Amaro Ramirez, Oakland, CA (US); Marcos Kawazoe Aguilera, Mountain View, CA (US); Pratap Subrahmanyam, Saratoga, CA (US); Rajesh Venkatasubramanian, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 49 days.

(21) Appl. No.: 17/344,514

(22) Filed: Jun. 10, 2021

(65) Prior Publication Data
US 2022/0398014 A1    Dec. 15, 2022

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
CPC ....... G06F 3/064; G06F 3/0604; G06F 3/0679
See application file for complete search history.

(56) References Cited

U.S. PATENT DOCUMENTS

| | | | |
|---|---|---|---|
| 2014/0258670 A1* | 9/2014 | Venkatasubramanian | G06F 12/08 711/171 |
| 2015/0161055 A1* | 6/2015 | Deguillard | G06F 9/455 711/6 |
| 2015/0161056 A1* | 6/2015 | Deguillard | G06F 9/45558 711/6 |
| 2018/0046581 A1* | 2/2018 | Banerjee | G06F 11/079 |
| 2018/0232177 A1* | 8/2018 | Park | G06F 3/0616 |
| 2019/0220318 A1* | 7/2019 | Yang | G06F 9/5022 |
| 2019/0220418 A1* | 7/2019 | Chen | G06F 12/0253 |
| 2019/0370009 A1* | 12/2019 | Venkatraman | G06F 3/0604 |
| 2021/0200463 A1* | 7/2021 | Seo | G06F 12/0246 |
| 2021/0216372 A1* | 7/2021 | Pan | G06F 9/505 |
| 2022/0229684 A1* | 7/2022 | Waldspurger | G06F 9/45558 |
| 2022/0283873 A1* | 9/2022 | Waldspurger | G06F 9/45558 |

* cited by examiner

*Primary Examiner* — Francisco A Grullon
(74) *Attorney, Agent, or Firm* — Thomas | Horstemeyer LLP (57) ABSTRACT

Disclosed are various embodiments for high throughput reclamation of pages in memory. A first plurality of pages in a memory of the computing device are identified to reclaim. In addition, a second plurality of pages in the memory of the computing device are identified to reclaim. The first plurality of pages are prepared for storage on a swap device of the computing device. Then, a write request is submitted to a swap device to store the first plurality of pages. After submission of the write request, the second plurality of pages are prepared for storage on the swap device while the swap device completes the write request.

17 Claims, 5 Drawing Sheets

HIGH THROUGHPUT MEMORY PAGE RECLAMATION

BACKGROUND

Virtual memory systems provided by operating systems often make use of swap devices to store pages evicted from the physical memory of a computing device. Historically, swap devices were many orders of magnitude slower than physical memory in terms of both latency and throughput. However, as solid state disk (SSD) drives, network bandwidth, and Peripheral Component Interconnect Express (PCI-E) devices continue to evolve, the latency and throughput gaps between swap devices and physical memory continue to decrease. As a result, inefficiencies in the implementations of operating system virtual memory systems contribute to a proportionally larger share of the total cost of swapping.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various high throughput approaches for reclaiming pages in memory. Execution of reclamation steps can be overlapped to improve the efficiency of the reclamation process using the various techniques of the present disclosure. Although reclamation steps for a particular page or batch of pages being reclaimed should be performed in sequence, the reclamation steps for a single page or batch of pages can be interwoven or overlapped with reclamation steps for other pages or batches of pages to improve the efficiency of resource utilization when reclaiming pages.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
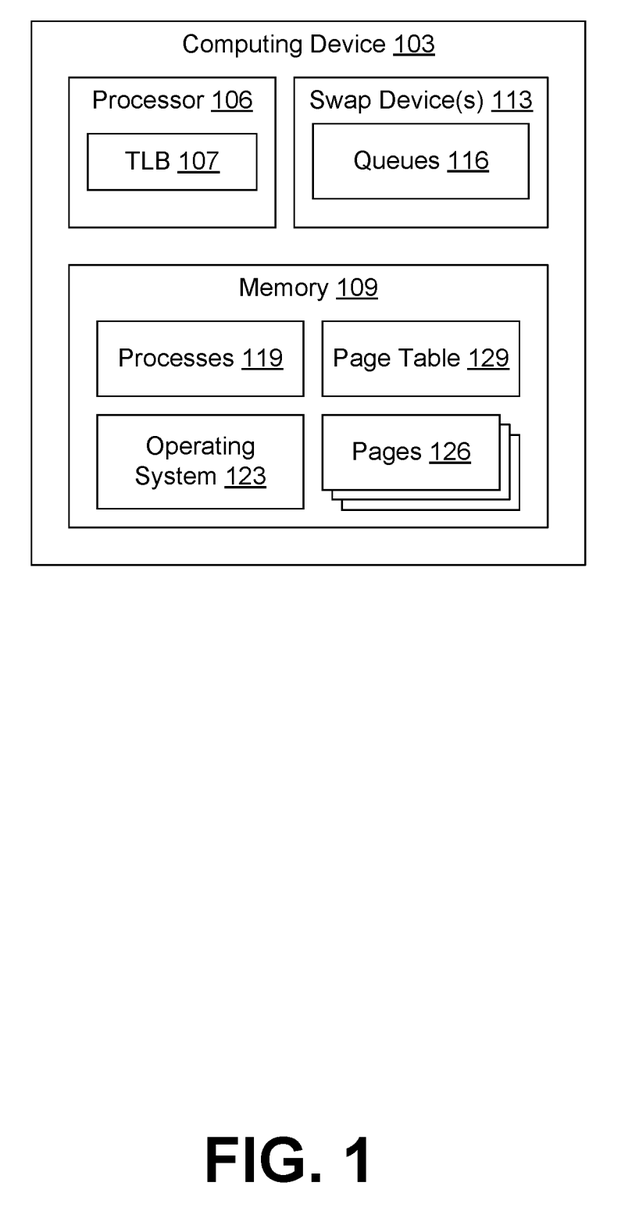
FIG. 1 is a drawing depicting a computing device that could implement various embodiments of the present disclosure.

FIG. 1 depicts a schematic block diagram of one example of a computing device 103 according to various embodiments of the present disclosure. The computing device 103 can have one or more processors 106. The computing device 103 can also have a memory 109. The computing device 103 can also have one or more swap devices 113 attached to a bus or interconnect, allowing the swap devices 113 to be in data connection with the processor 106 and/or memory 109. The swap devices 113 could contain or provide one or more queues 116 for input/output operations.

The processor 106 can represent any circuit or combination of circuits that can execute one or more machine-readable instructions stored in the memory 109 that make up a computer program or process and store the results of the execution of the machine-readable instructions in the memory 109. The processor 106 can also be configured to receive data from or send commands to one or more swap devices 113. In some implementations, the processor 106 may be configured to perform one or more machine-readable instructions in parallel or out of order. This could be done if the processor 106 includes multiple processor cores and/or additional circuitry that supports simultaneous multithreading (SMT). Examples of a processor 106 can include a central processing unit (CPU), a graphics processing unit (GPU), a field-programmable gate array (FPGA), application specific integrated circuits (ASICs), etc.

The processor 106 can also include a translation lookaside buffer (TLB) 107, which is a cache within the memory management unit (MMU) of the processor that is used to optimize translations of virtual memory addresses to physical memory addresses. For example, the TLB 107 can store the most recent translation or mapping of a virtual memory address to a physical memory address so that a subsequent memory access for a cached address does not require the processor 106 to perform a page walk to identify a physical memory address of a virtual memory address accessed by a process 119. A TLB 107 can typically be found in any processor 106 that supports virtual memory through an MMU.

The memory 109 can include both volatile and nonvolatile memory and data storage components. Volatile components are those that do not retain data values upon loss of power. Nonvolatile components are those that retain data upon a loss of power. Thus, the memory can include persistent memory, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Various types of data and machine-readable instructions may be stored in the memory 109. For example, one or more processes 119 may be stored in the memory 109. In some implementations, an operating system 123 may also be stored in the memory 109. Moreover, data used by the processes 119 or operating system 123 may also be stored in the memory 109.

The memory 109 can also be segmented or subdivided into one or more blocks of memory, which are represented as pages 126. Portions of memory 109 can be stored to the swap device 113 by writing one or more pages 126 to the swap device 113 to make those pages of memory 109 available. When the data stored in the pages 126 written to the swap device 113 needs to be read by a process 119, the pages 126 can be read from the swap device 113 and loaded into the memory 109 to be read by the process 119.

To map virtual memory addresses to physical memory addresses, the operating system 123 can maintain a page table 129. The page table 129 can store a mapping of each virtual memory address to a page 126 of the memory 109, as well as a mapping of the page 126 to one or more respective physical memory addresses or a location on a swap device 113. As previously discussed, frequently or recently referenced entries in the page table 129 may be stored in the TLB 107 of the processor 106.

A process 119 can represent a collection of machine-readable instructions stored in the memory 109 that, when executed by the processor 106 of the computing device 103, cause the computing device 103 to perform one or more tasks. A process 119 can represent a program, a sub-routine or sub-component of a program, a library used by one or more programs, etc. When a process requests access to a hardware or software resource for which it lacks permission to interact with, the process 119 can generate an interrupt and provide or send the interrupt to the operating system 123.

The operating system 123 can include any system software that manages the operation of computer hardware and software resources of the computing device 103. The operating system 123 can also provide various services or functions to computer programs, such as processes 119, that are executed by the computing device 103. Accordingly, the operating system 123 may schedule the operation of tasks or processes 119 by the processor 106, act as an intermediary between processes 119 and hardware of the computing device, such as swap devices 113. The operating system 123 may also implement and/or enforce various security safeguards and mechanisms to prevent access to hardware or software resources by unprivileged or unauthorized users or processes 119. In some implementations, the operating system 123 may also include or serve as a hypervisor that manages the resources of a host machine to serve one or more virtual machines executing as processes 119 on the computing device 103.

The operating system 123 can also implement a virtual memory system that provides an abstract representation of the memory 109 available on the computing device 103, such as the RAM. Among the features provided by the virtual memory system are a per process 119 address space, which maps virtual addresses used by a process 119 to physical addresses of the memory 109. The processor's memory management unit (MMU) can translate these virtual addresses to physical addresses, when used. The operating system 123 can use the virtual memory system to present more memory 106 to individual processes 119 than is physically available.

The swap devices 113 represent auxiliary devices or storage devices used to store the contents of memory 109 that is not currently in use. This could occur, for example, when the operating system 123 allocates memory for a second process 119, but there is no memory 109 available. In this situation, the operating system 123 could write the contents of one or more pages of memory 109 to the swap device 113 for temporary storage. When the first process needs to access the contents of the memory 109 stored on the swap device 113, the operating system 123 can load the contents of the memory 109 from the swap device 113 to memory 109 for use by the first process 119.

Accordingly, swap devices 113 can refer to any hardware component that is attached to the computing device 103 and is controlled by the computing device 103 or the operating system 123 that provides data storage capability or access to data storage. For example, local storage devices, such as solid state drives (SSDs) or hard disk drives (HDDs) could be used as swap devices 113. In these instances, a portion of the local storage device or the entirety of the local storage device could be allocated for use as a swap device 113. However, network interface cards (NICs) could also be used as swap devices 113, such as when the NICs provide a low-latency, high-bandwidth connection to a storage server or memory server. This could occur, for example, in cluster computing environments.

A swap device 113 can also include one or more queues 116, which could be used for input/output (I/O) operations. Individual queues 116 can represent queues that store I/O operations or requests. Peripheral devices in general may offer one or more queues in order to allow different processes 119 to interact with the peripheral device without impacting the I/O of other processes 119, to provide for different types of I/O, or prioritize one type of I/O over another. In some instances, individual queues 116 may be serviced by the swap device 113 on a round-robin basis. In other instances, some swap devices 119 may also allow for queues 116 to have different priorities, with I/O requests in higher priority queues 116 being serviced before I/O requests in lower priority queues 116. In the event that multiple queues 116 have the same priority, the swap device 119 may also service the queues 116 with the same priority on a round-robin basis.

For example, a network interface card could provide multiple queues 116, with different queues allocated for different types of I/O requests and, therefore, assigned different priorities. For example, remote direct memory access (RDMA) I/O could be allocated high priority queues to reduce the latency involved in accessing resources on remote computing devices. As another example, a process 119 assigned a high priority could be allowed to read from and write to higher priority queues 116. Or, individual processes 119 could be allocated process specific queues 116, so that one process 119 cannot consume all of the I/O resources provided by the swap device 113, such as a network interface card.

The operating system 123 can be configured to make use of the queues 116 of a swap device 113 to improve the latency involved in reading the contents of memory pages from a swap device 113 in response to a page fault. When the operating system 123 detects that a processor 106 accessing the contents of an address in memory 109 has caused a page fault, the operating system 123 can send a read request for the corresponding page to a swap device 113. Because reading the contents of a page 126 in response to a page fault is often a latency sensitive operation, the operating system 123 can place the read request in a high priority queue 116. This causes the swap device 113 to service the read request ahead of other I/O requests stored in lower priority queues 116, such as write requests. As a result, a read request in response to a page fault can be serviced almost immediately by the swap device 113. For those swap devices 113 that do not provide hardware support for prioritizing queues 116, the operating system 123 could instead select a group or set of queues 116 to use exclusively for read requests in response to page faults. As the swap device 113 services individual queues 116 in round-robin fashion, a read request is more likely to be at the head of a reserved queue 116, and be service more quickly, than if it were at a queue 116 that contained multiple I/O requests.

Figure 2:
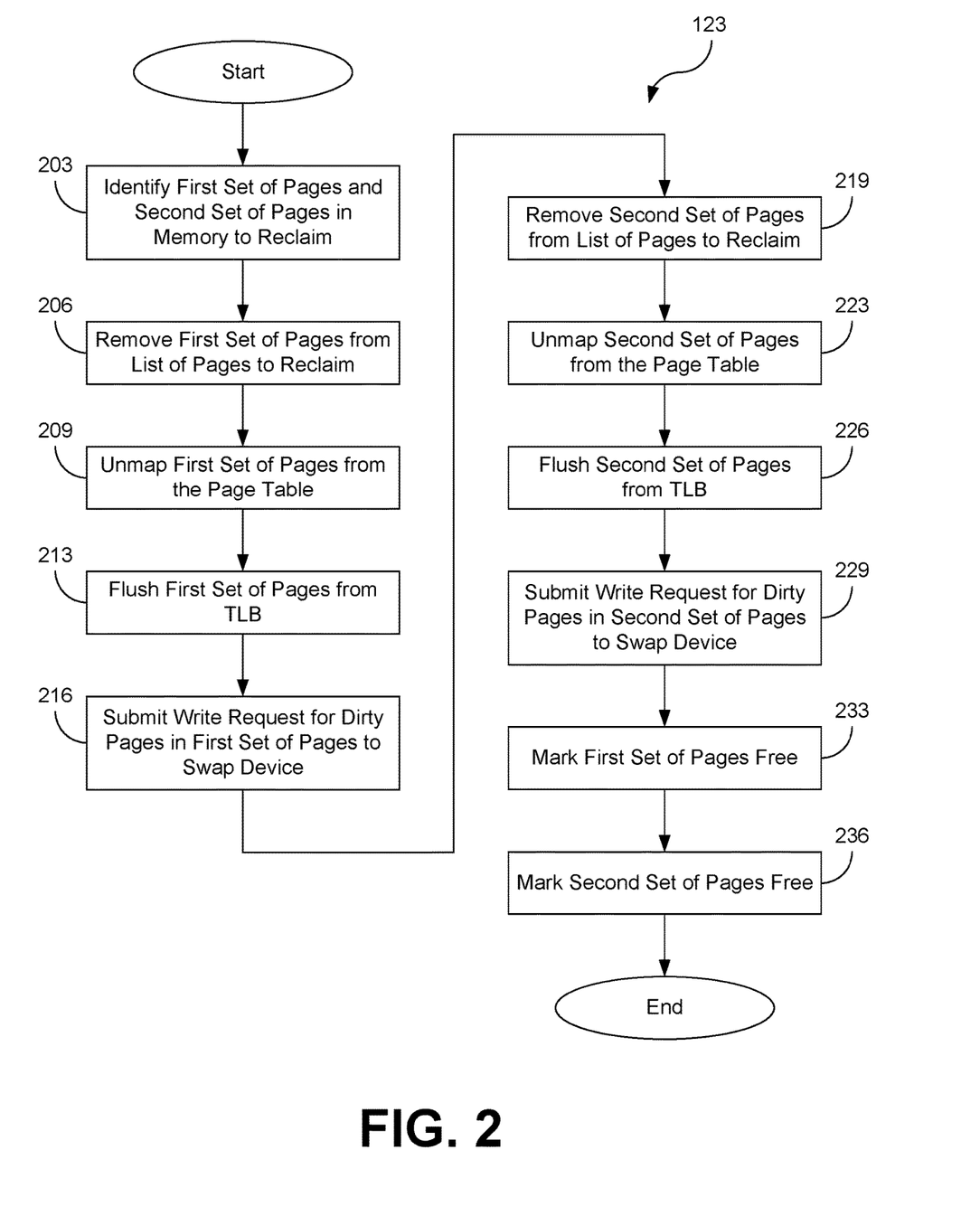
FIG. 2 is a flowchart illustrating one example of functionality implemented by the computing device of FIG. 1 according to various embodiments of the present disclosure.

Referring next to FIG. 2, shown is a flowchart that provides one example of the operation of a portion of the operating system 123. The flowchart of FIG. 2 provides merely an example of the many different types of functional arrangements that can be employed to implement the operation of the depicted portion of the operating system 123. As an alternative, the flowchart of FIG. 2 can be viewed as depicting an example of elements of a method implemented within the computing device 103.

Beginning with block 203, the operating system 123 can identify a first set of pages 126 and a second set of pages 126 of the memory 109 that are available for reclamation. This can be done using a wide variety of approaches. For example, those pages 126 that are the least recently used pages 126 may be selected for reclamation. As another example, those pages 126 that are the least frequently used pages 126 may be selected for reclamation. Other approaches can also be used. Because page reclamation tends to be more efficient when groups of pages 126 are processed together, the operating system 123 may group identified pages 126 into sets of pages 126 that can be processed or otherwise reclaimed together.

Then, at block 206, the operating system 123 can remove the pages 126 in the first set of pages 126 identified at block 203 from a list of allocated pages 126 that can be reclaimed. Although this does not mean the page 126 is considered to be freed, it does prevent the page 126 from being included in the second or a subsequent set of pages 126 to be reclaimed.

Next, at block 209, the operating system 123 can then unmap the pages 126 in the first set of pages 126 from the page table 129. This can be done to prevent a process 119 from accessing or modifying the contents of a page 126 as it is being reclaimed.

Moving on to block 213, the operating system 123 can send an instruction to the processor 106 to flush the TLB 107 of any entries for pages 126 in the first set of pages 126 identified at block 203. This can be done for similar reasons that pages 126 are unmapped from the page table 129 at block 209—in order to prevent the content of individual pages 126 being accessed if the processor 106 receives an instruction from a process 119 to access the contents of a page 126 and the memory address within the page 126 is stored in the TLB 107.

Then, at block 216, the operating system 123 can submit a write request for dirty pages 126 in the first set of pages 126 to the swap device 113. For example, if the swap device 113 were a disk, the operating system 123 could send a command to the swap device 113 to write the contents of the dirty pages 126 in the first set of pages 126 to disk. As another example, if the swap device 113 were a network device, the operating system 123 could send a command to the swap device 113 to send the contents of the dirty pages 126 to a second computing device connected by a network to the computing device 103. If the swap device 113 supports queues 116, the operating system 123 may submit the write by saving, adding, or inserting the dirty pages 126 in one or more queues 116, which allows for the processor 106 to offload the processing of the I/O to the swap device 113. However, even if the operating system 123 causes the processor 106 to save the dirty pages 126 to one or more queues 116, the operating system 123 still has to wait for the write to complete before the pages 126 can be marked free at block 233.

Due to bandwidth and latency constraints, the write that was submitted at block 216 may take a significant amount of time to complete. For example, the swap device 113 may have less bandwidth for reading and writing than the memory 106. As another example, the swap device 113 may be bandwidth constrained because multiple computing devices 103 or multiple processes 119 are having pages 126 saved to or read from the swap device 113.

Accordingly, while the operating system 123 waits for the write submitted at block 216 to complete, the operating system 123 can, at block 219 remove the pages 126 in the second set of pages 126 identified at block 203 from a list of allocated pages 126 that can be reclaimed. Although this does not mean the page 126 is considered to be freed, it does prevent the page 126 from being included in the second or a subsequent set of pages 126 to be reclaimed.

Proceeding to block 223, the operating system 123 can then unmap the pages 126 in the second set of pages 126 from the page table 129. This can be done to prevent a process 119 from accessing or modifying the contents of a page 126 as it is being reclaimed.

Then, at block 226, the operating system 123 can send an instruction to the processor 106 to flush the TLB 107 of any entries for pages 126 in the second set of pages 126 identified at block 203. This can be done for similar reasons that pages 126 are unmapped from the page table 129 at block 223—in order to prevent the content of individual pages 126 being accessed if the processor 106 receives an instruction from a process 119 to access the contents of a page 126 and the memory address within the page 126 is stored in the TLB 107.

Next, at block 229, the operating system 123 can a submit write request for any dirty pages 126 in the second set of pages 126 to the swap device 113. For example, if the swap device 113 were a disk, the operating system 123 could send a command to the swap device 113 to write the contents of the dirty pages 126 in the second set of pages 126 to disk. As another example, if the swap device 113 were a network device, the operating system 123 could send a command to the swap device 113 to send the contents of the dirty pages 126 to a second computing device connected by a network to the computing device 103. If the swap device 113 supports queues 116, the operating system 123 may submit the write by saving, adding, or inserting the dirty pages 126 in one or more queues 116, which allows for the processor 106 to offload the processing of the I/O to the swap device 113. However, even if the operating system 123 causes the processor 106 to save the dirty pages 126 to one or more queues 116, the operating system 123 still has to wait for the write to complete before the pages 126 can be marked free at block 236.

Assuming that the write to the swap device 113 that was submitted at block 216 has completed, then, at block 233, the operating system 123 can mark those pages 126 in the first set of pages 126 as being free. By marking the pages 126 in the first set of pages 126 as free, the operating system 123 makes them available for use by other processes 119. Similarly, at block 236, the operating system 123 can mark those pages 126 in the second set of pages 126 as being free once the write to the swap device 113 that was submitted at block 229 completes.

Figure 3:
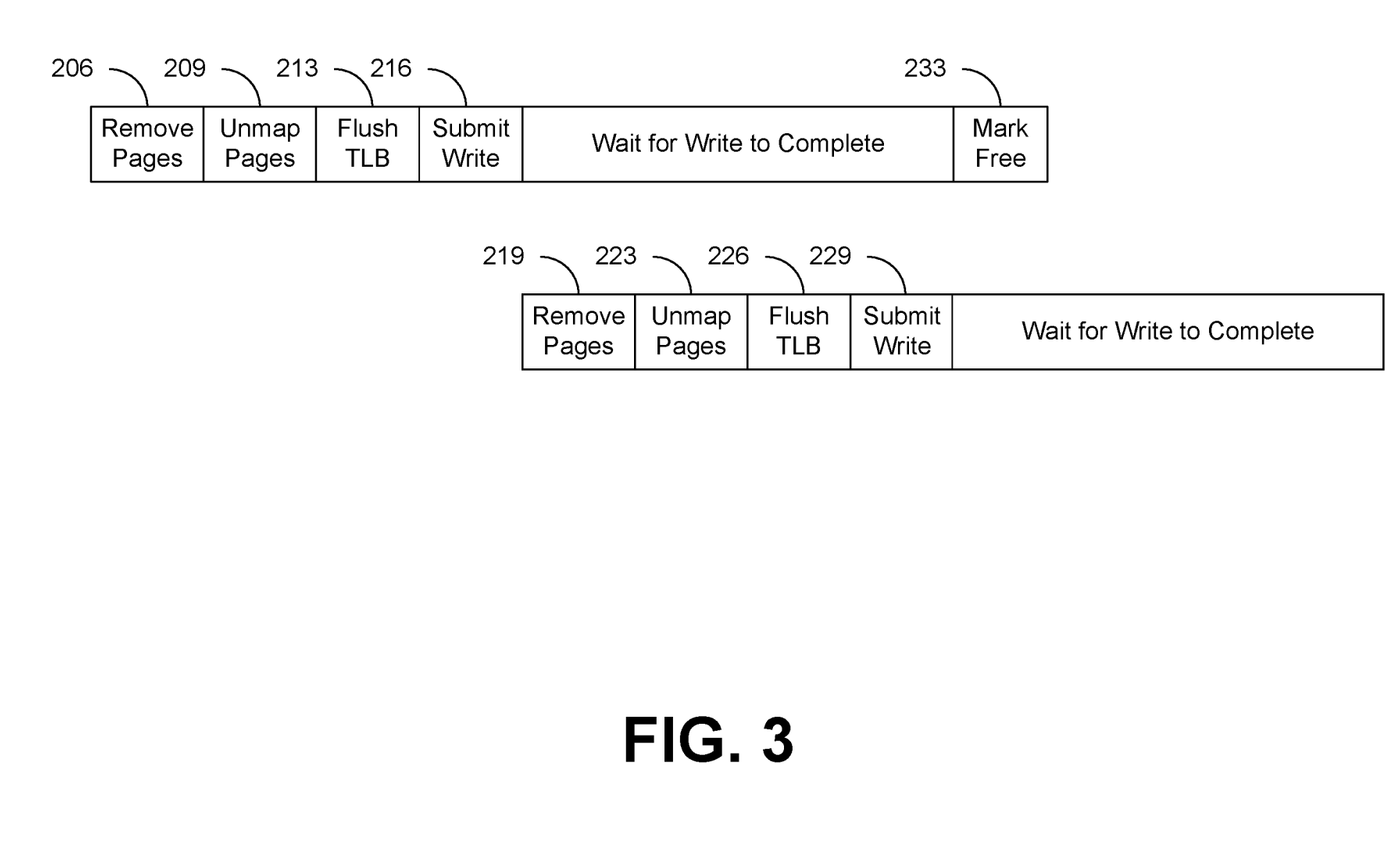
FIG. 3 is a pictorial diagram illustrating the operations resulting from the method implemented according to the flowchart of FIG. 2.

FIG. 3 depicts how the blocks described in the flowchart of FIG. 2 can be scheduled or otherwise interleaved to improve the throughput at which pages 126 can be reclaimed. As shown, blocks 206-216 are processed in order for the first set of pages 126 to be reclaimed. These steps have to be processed in order because it would be unsafe to proceed to a subsequent block (e.g., writing dirty pages 126 at block 216) if the pages had not been unmapped at block 209 or flushed from the TLB 107 at block 213. However, other steps or operations could be performed or inserted between individual ones of blocks 206-216.

As illustrated in FIG. 3, the processor 106 may be idle while the operating system 123 waits for the write to the swap device 113 that was submitted at block 216 to complete. Meanwhile, the swap device 113 may be busy processing the write of the dirty pages 126. Accordingly, the operations of blocks 219-229 related to freeing a second set of pages 126 could be performed by the operating system 123 while the processor 106 would otherwise be idle waiting for the write submitted at block 216 to complete. As a result, once the write submitted at block 216 is completed, the operating system could soon after begin writing the dirty pages 126 in the second set of pages 126 to the swap device 113. This minimizes the time in which the swap device 113 would otherwise be idle, thereby maximizing the rate at which dirty pages 126 can be written to the swap device 113 and, therefore, maximizing the rate at which pages 126 of memory 109 can be reclaimed by the operating system 123.

Figure 4:
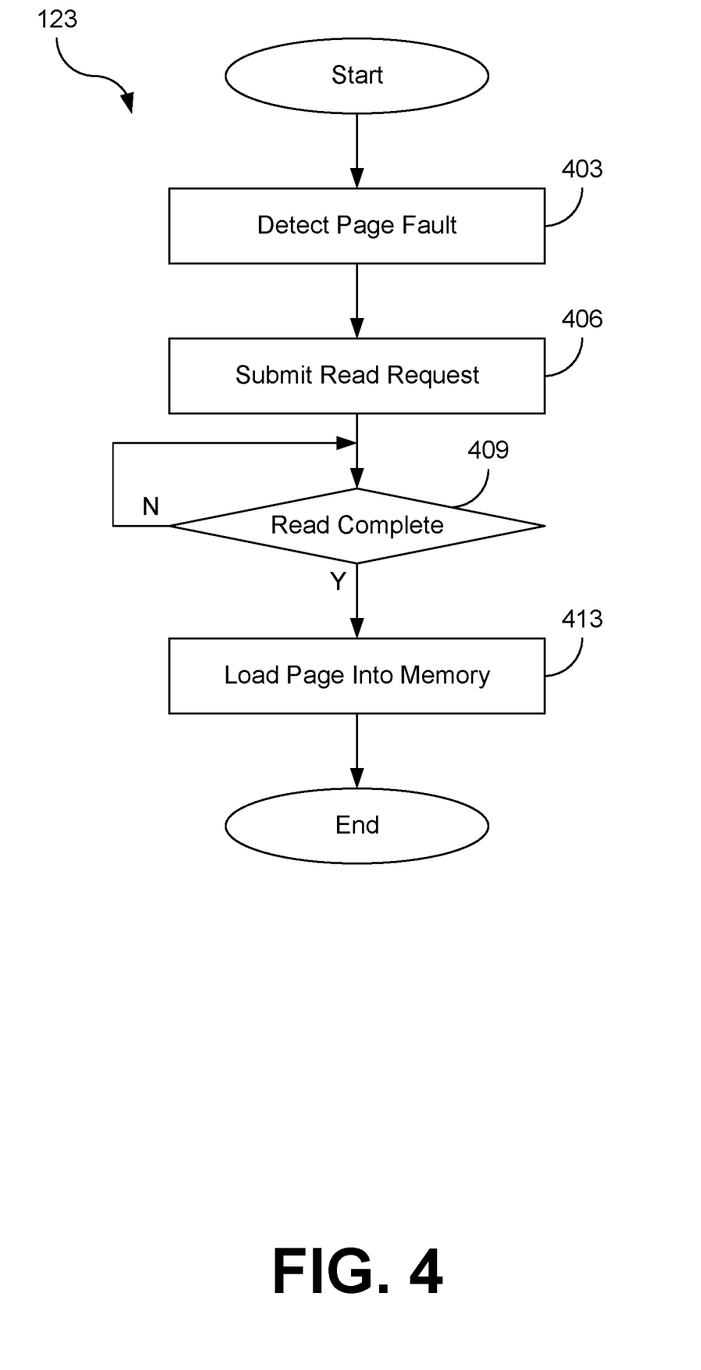
FIG. 4 is a flowchart illustrating one example of functionality implemented by the computing device of FIG. 1 according to various embodiments of the present disclosure.

Referring next to FIG. 4, shown is a flowchart that provides one example of the operation of a portion of the operating system 123, whereby the page fault process is integrated into the previously described workflows. The flowchart of FIG. 4 provides merely an example of the many different types of functional arrangements that can be employed to implement the operation of the depicted portion of the operating system 123. As an alternative, the flowchart of FIG. 4 can be viewed as depicting an example of elements of a method implemented within the computing device 103.

Beginning with block 403, the operating system 123 can detect a page fault. This can occur, for example, when a process 119 attempts to access the contents of a virtual memory address, but the contents of the virtual memory address are located in a page 126 that is currently stored by the swap device 113.

Then, at block 406, the operating system 123 can submit a read request to the swap device 113 for the page 126 and its contents. This could be done by sending the request directly to the swap device 113, or by placing the read request in a queue 116 that is assigned to handle reads from the swap device 113. In some implementations, the read request could be submitted to a separate queue 116 than the queue 116 to which the write request for the pages 126 was submitted (e.g., at block 216, block 229, etc.). This could be done to allow the swap device 113 to process the read request separately from and/or concurrently with any write of pages 126. In some instances, the read request could also be submitted to a higher priority queue 116 for the swap device 113 than the write request to attempt to decrease any latency involved in processing the read request.

Next, at block 409, the operating system 123 waits to see if the read has completed. If the read has not yet completed, then the operating system 123 can continue to poll or wait to receive an interrupt indicating that the read has completed. Once the read from the swap device 113 completes, the process can move onto block 413.

Subsequently, at block 413, the operating system 123 can load the page 126 into the memory 109. This can include updating the page table 129 to reflect the physical memory address within the page 126 that maps to the virtual memory address requested by the process 119 at block 403. Once the page 126 is loaded into memory, the process of FIG. 4 can subsequently end.

Figure 5:
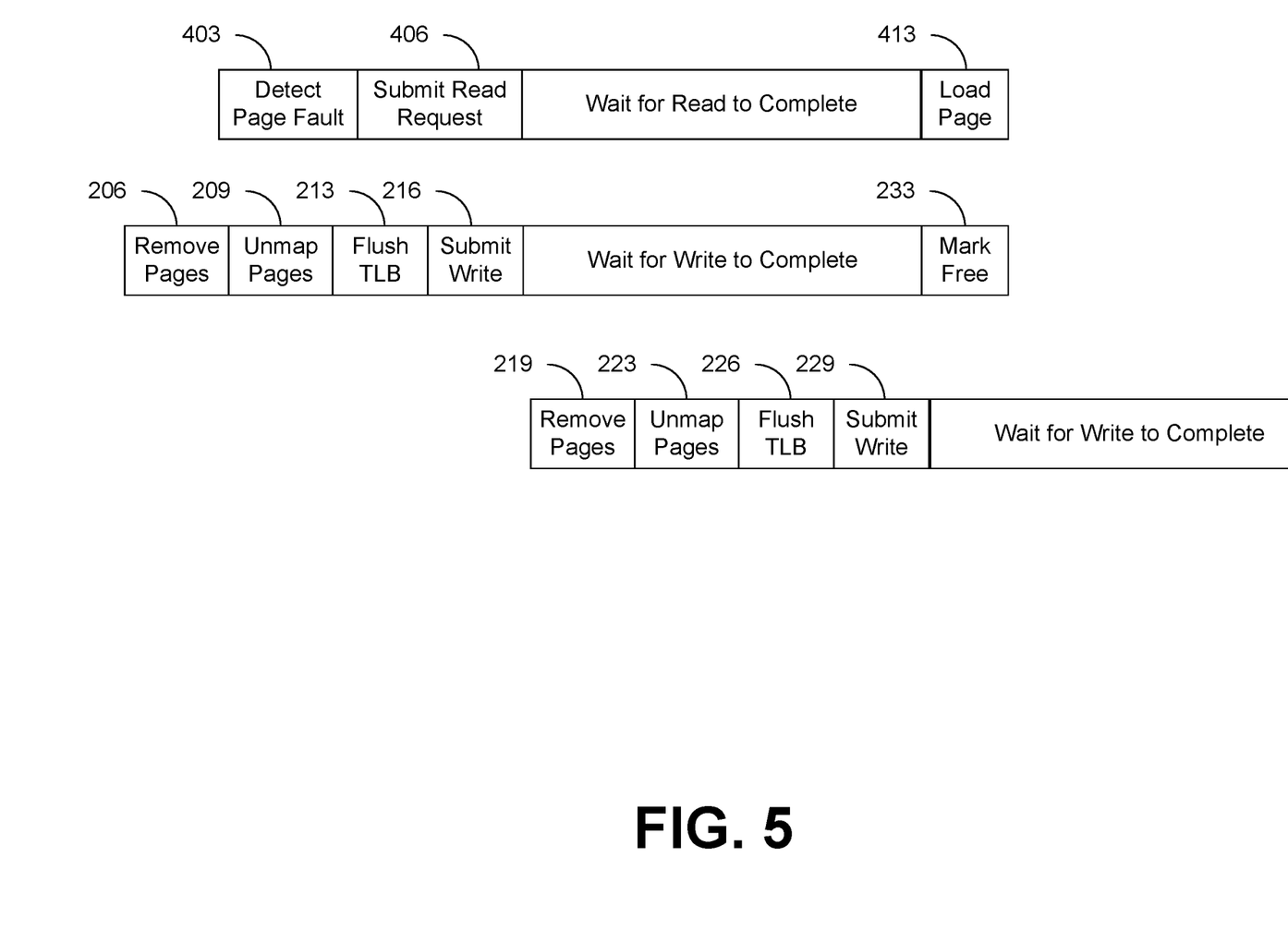
FIG. 5 is a pictorial diagram illustrating the operations resulting from the method implemented according to the flowchart of FIG. 4.

FIG. 5 depicts how the blocks described in the flowcharts of FIGS. 2 and 4 can be scheduled or otherwise interleaved to improve the throughput at which pages 126 can be reclaimed and page faults can be processed. As shown, blocks 206-216 are processed in order for the first set of pages 126 to be reclaimed. These steps have to be processed in order because it would be unsafe to proceed to a subsequent block (e.g., writing dirty pages 126 at block 216) if the pages had not been unmapped at block 209 or flushed from the TLB 107 at block 213. However, other steps or operations could be performed or inserted between individual ones of blocks 206-216. For example, blocks 403 and 406 could be performed concurrently with blocks 209, 213, and 216. However, blocks 403 and/or 406 could be performed in between operations of one or more of blocks 206-216.

As illustrated in FIG. 5, the processor 106 may be idle while the operating system 123 waits for the write to the swap device 113 that was submitted at block 216 to complete. Meanwhile, the swap device 113 may be busy processing the write of the dirty pages 126. Accordingly, the operations of blocks 219-229 related to freeing a second set of pages 126 could be performed by the operating system 123 while the processor 106 would otherwise be idle waiting for the write submitted at block 216 to complete. As a result, once the write submitted at block 216 is completed, the operating system could soon after begin writing the dirty pages 126 in the second set of pages 126 to the swap device 113. This minimizes the time in which the swap device 113 would otherwise be idle, thereby maximizing the rate at which dirty pages 126 can be written to the swap device 113 and, therefore, maximizing the rate at which pages 126 of memory 109 can be reclaimed by the operating system 123.

However, many swap devices 113 can operate in full-duplex mode, wherein the swap device 113 can read and write at the same time without impacting bandwidth. For example, wired Ethernet networks allow for computing devices to both send and receive data at the same time at full-speed. Accordingly, while the operating system 123 is writing dirty pages 126 to the swap device 113 in batches, the operating system 123 could also schedule reads of pages 126 from the swap device 113 to occur at the same time. For example, as illustrated in FIG. 5, the swap device 113 could be servicing a write request and a read request at the same time to more efficiently and/or fully utilize the bandwidth of the swap device 113. Meanwhile, to minimize idling of the processor 106, blocks 219, 223, 226, and 229 could be performed to prepare a second group of dirty pages 126 for writing to the swap device 113 once the current write of dirty pages 126 from the first set of pages 126 completes.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including persistent memory, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include persistent memory, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be persistent memory, a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor, a memory, and a swap device; and
machine-readable instructions stored in the memory that, when executed by the processor, cause the computing device to at least:
identify a first plurality of pages in the memory to reclaim;
identify a second plurality of pages in the memory to reclaim;
prepare the first plurality of pages for storage on the swap device;
submit a first write request to the swap device to store the first plurality of pages;
prepare the second plurality of pages for storage on the swap device while the swap device completes the first write request;
determine that the first write request has completed; and
submit a second write request to the swap device to store the second plurality of pages, wherein the second write request is submitted in response to completion of the first write request and completion of preparation of the second plurality of pages for storage on the swap device.

2. The system of claim 1, wherein the machine-readable instructions further cause the computing device to at least mark the first plurality of pages as free in response to completion of the first write request and completion of preparation of the second plurality of pages for storage on the swap device.

3. The system of claim 1, wherein the machine-readable instructions further cause the computing device to at least:
determine that a page fault has occurred as a result of an attempt to access a page in the memory; and
submit a read request for the page to the swap device, wherein the read request is submitted concurrently with the first write request.

4. The system of claim 3, wherein the read request is submitted to a first queue of the swap device and the first write request is submitted to a second queue of the swap device.

5. The system of claim 4, wherein the first queue has a higher priority than the second queue.

6. The system of claim 1, wherein:
the computing device is a first computing device;
the memory is a first memory;
the swap device is a second memory of a second computing device connected to the first computing device by a network; and
the machine-readable instructions that cause the computing device to submit the first write request to the swap device further cause the computing device to add the first plurality of pages to a queue provided by a network interface card of the first computing device.

7. A computer-implemented method, comprising:
identifying a first plurality of pages in a memory of a computing device to reclaim;
identifying a second plurality of pages in the memory of the computing device to reclaim;
preparing the first plurality of pages for storage on a swap device of the computing device;
submitting a first write request to the swap device to store the first plurality of pages;
preparing the second plurality of pages for storage on the swap device while the swap device completes the first write request;
determining that the first write request has completed; and
submitting a second write request to the swap device to store the second plurality of pages, wherein the second write request is submitted in response to completion of the first write request and completion of preparation of the second plurality of pages for storage on the swap device.

8. The computer-implemented method of claim 7, further comprising marking the first plurality of pages as free in response to completion of the first write request and completion of preparation of the second plurality of pages for storage on the swap device.

9. The computer-implemented method of claim 7, further comprising:
determining that a page fault has occurred as a result of an attempt to access a page in the memory; and
submitting a read request for the page to the swap device, wherein the read request is submitted concurrently with the first write request.

10. The computer-implemented method of claim 9, wherein the read request is submitted to a first queue of the swap device and the first write request is submitted to a second queue of the swap device.

11. The computer-implemented method of claim 10, wherein the first queue has a higher priority than the second queue.

12. The computer-implemented method of claim 7, wherein:
the computing device is a first computing device;
the memory is a first memory;
the swap device is a second memory of a second computing device connected to the first computing device by a network; and
the computer-implemented method further comprises submitting the first write request to the swap device further cause the computing device to add the first plurality of pages to a queue provided by a network interface card of the first computing device.

13. A non-transitory, computer-readable medium, comprising machine-readable instructions that, when executed by a processor of a computing device, cause the computing device to at least:
identify a first plurality of pages in a memory of the computing device to reclaim;
identify a second plurality of pages in the memory of the computing device to reclaim;
prepare the first plurality of pages for storage on a swap device of the computing device;
submit a write request to the swap device to store the first plurality of pages;
prepare the second plurality of pages for storage on the swap device while the swap device completes the write request;
determine that a page fault has occurred as a result of an attempt to access a page in the memory; and
submit a read request for the page to the swap device, wherein the read request is submitted concurrently with the write request,
wherein the read request is submitted to a first queue of the swap device and the write request is submitted to a second queue of the swap device.

14. The non-transitory, computer-readable medium of claim 13, wherein the machine-readable instructions further cause the computing device to at least mark the first plurality of pages as free in response to completion of the write request and completion of preparation of the second plurality of pages for storage on the swap device.

15. The non-transitory, computer-readable medium of claim 13, wherein the write request is a first write request and the machine-readable instructions further cause the computing device to at least:
   determine that the first write request has completed; and
   submit a second write request to the swap device to store the second plurality of pages, wherein the second write request is submitted in response to completion of the first write request and completion of preparation of the second plurality of pages for storage on the swap device.

16. The non-transitory, computer-readable medium of claim 13, wherein:
   the computing device is a first computing device;
   the memory is a first memory;
   the swap device is a second memory of a second computing device connected to the first computing device by a network; and
   the machine-readable instructions that cause the computing device to submit the write request to the swap device further cause the computing device to add the first plurality of pages to a queue provided by a network interface card of the first computing device.

17. The non-transitory, computer-readable medium of claim 13, wherein the first queue has a higher priority than the second queue.

\* \* \* \* \*